United States Patent [19]
Satoh

[11] Patent Number: 6,085,297
[45] Date of Patent: Jul. 4, 2000

[54] SINGLE-CHIP MEMORY SYSTEM INCLUDING BUFFER

[75] Inventor: Kazuaki Satoh, Tokyo, Japan

[73] Assignee: NEC Corporation, Tokyo, Japan

[21] Appl. No.: 08/905,730

[22] Filed: Aug. 4, 1997

[30]     Foreign Application Priority Data

Aug. 9, 1996   [JP]   Japan ................................... 8-227759

[51] Int. Cl.⁷ .................................................. G06F 12/08
[52] U.S. Cl. .......................... 711/158; 711/118; 711/117; 711/151; 711/168; 710/52
[58] Field of Search ................... 711/117, 118, 711/151, 158, 168; 710/52

[56]             References Cited

U.S. PATENT DOCUMENTS

| | | | |
|---|---|---|---|
| 4,729,093 | 3/1988 | Mothersole et al. | 712/207 |
| 5,553,268 | 9/1996 | Willenz et al. | 711/158 |
| 5,666,494 | 9/1997 | Mote, Jr. | 711/167 |

FOREIGN PATENT DOCUMENTS

| | | |
|---|---|---|
| 55-105881 | 8/1980 | Japan . |
| 61-237145 | 10/1986 | Japan . |

*Primary Examiner*—Hiep T. Nguyen
*Attorney, Agent, or Firm*—McGinn & Gibb, P.C.

[57]             ABSTRACT

To operate faster, a memory system includes a central processing unit (CPU) for executing a first instruction, and for outputting first, second and third signals, a memory device for storing first data and the first instruction, a first buffer for storing second data, a controller for writing the second data into the memory device when the controller receives the first signal, for reading the first data from the memory device after writing the second data into the memory device when the controller receives the second signal, and for reading the first instruction from the memory device and sending the first instruction to the CPU before writing the second data into the memory device when the controller receives the third signal.

5 Claims, 7 Drawing Sheets

SINGLE-CHIP MEMORY SYSTEM INCLUDING BUFFER

BACKGROUND OF THE INVENTION

The present invention generally relates to a single-chip memory system, and more particularly to a memory system including a buffer for writing data and connected to a central processing unit (CPU) and a memory device including a memory cell array.

DESCRIPTION OF THE RELATED ART

With recent advancement of microprocessor technology, an operating speed of a central processing unit (CPU) of a computer system has increased. However, an operating speed, especially for writing data, of a memory device is still comparatively low. Therefore, when the CPU having an increased (e.g., high) operating speed is connected to a memory device having a low operating speed, the CPU must wait to operate a next instruction until the memory device finishes writing data.

For solving such a problem, Japanese Patent Application Laid-Open No. Sho 55-105881 and Japanese Patent Application Laid-Open No. Sho 61-237145 disclose a buffer for a writing operation and connected to the CPU and the memory device. The buffer stacks (e.g., latches) an address and data for writing. Therefore, the CPU can send the address and the data to the buffer regardless of the speed of the memory device. As a result, the CPU operates a next instruction without delay.

However, the conventional memory system having the buffer still has a problem.

Figure 1:
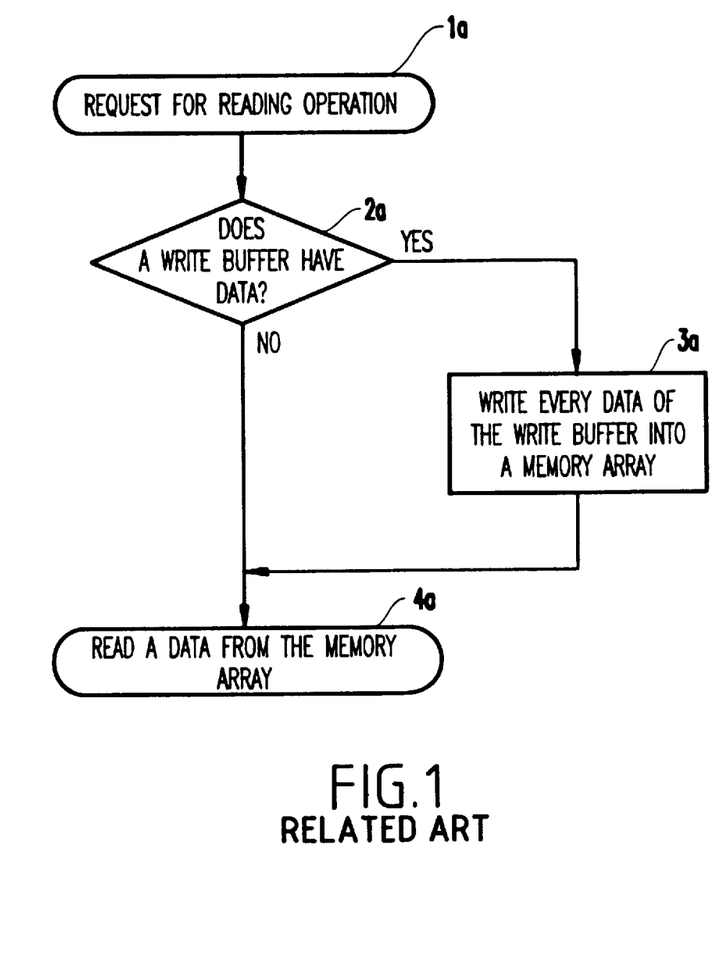
FIG. 1 is a flowchart showing a reading operation of a conventional memory system having a buffer.

FIG. 1 shows a flowchart for describing a reading operation of the conventional memory system having the buffer. First, the CPU requests a reading operation to the memory device for reading data (or instruction), when a present instruction represents an instruction for fetching data (or instruction) (step 1a).

In step 2a, it is determined whether a write buffer has data. When a write buffer has data (e.g., a "YES" in step 2a), the memory device writes the data of the buffer to a memory cell array (step 3a). After finishing writing the buffer data (step 3a), the memory device starts a reading operation corresponding to the present instruction (step 4a).

When the buffer has no data (e.g., a "NO" in step 2a), the memory device either is idle (e.g., ready to perform reading), or is almost finished with the previous operation. Therefore, the memory device immediately starts a reading operation of the data in the memory array corresponding to the present instruction (step 4a).

As mentioned above, the conventional memory system gives a higher priority to a writing operation than to a reading operation. This priority scheme is acceptable when the data for reading is merely data for operating some instruction(s). However, when the data for reading is an actual instruction, instead of merely data for operating some instruction(s), a problem occurs.

That is, the CPU cannot receive an instruction until the memory device finishes a writing operation for data stacked (e.g., latched) in the buffer.

Therefore, the CPU must wait for operating a next instruction, because the CPU cannot obtain the next instruction from the memory device, when the buffer has data. Thus, the memory system is prevented from operating with high speed. This is a problem.

SUMMARY OF THE INVENTION

In view of the foregoing problems of the conventional memory system having a buffer, it is therefore an object of the present invention to provide an improved memory system having a buffer and which operates at high speed.

Another object is to provide a method of conducting a reading operation of a memory system having a buffer.

In a first aspect, a memory system according to the present invention includes a central processing unit (CPU) for executing a first instruction, and for outputting first, second and third signals, a memory device for storing first data and the first instruction, a first buffer for storing second data, a controller for writing the second data into the memory device when the controller receives the first signal, for reading the first data from the memory device after writing the second data into the memory device when the controller receives the second signal, and for reading the first instruction from the memory device and sending, the first instruction to the CPU before writing, the second data into the memory device when the controller receives the third signal.

With the unique and unobvious structure of the present invention, the controller reads the first instruction before the second data is written into the memory device, when the controller receives the third signal. In contrast, the conventional memory system must wait to receive the instruction until the data stored in the buffer is written into the memory device.

Therefore, with the present invention, the CPU receives the first instruction faster than in the conventional memory system. As a result, the memory system according to the present invention executes instructions faster because the memory system according to the present invention need not wait until the data stored in the buffer is written into the memory device, for obtaining instructions. More specifically, the present invention (e.g., the controller) can force a writing operation to stop and can control a reading operation to begin. Thus, the writing operation (or whichever operation has a lower priority) can be interrupted to achieve the instruction reading operation.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 2:
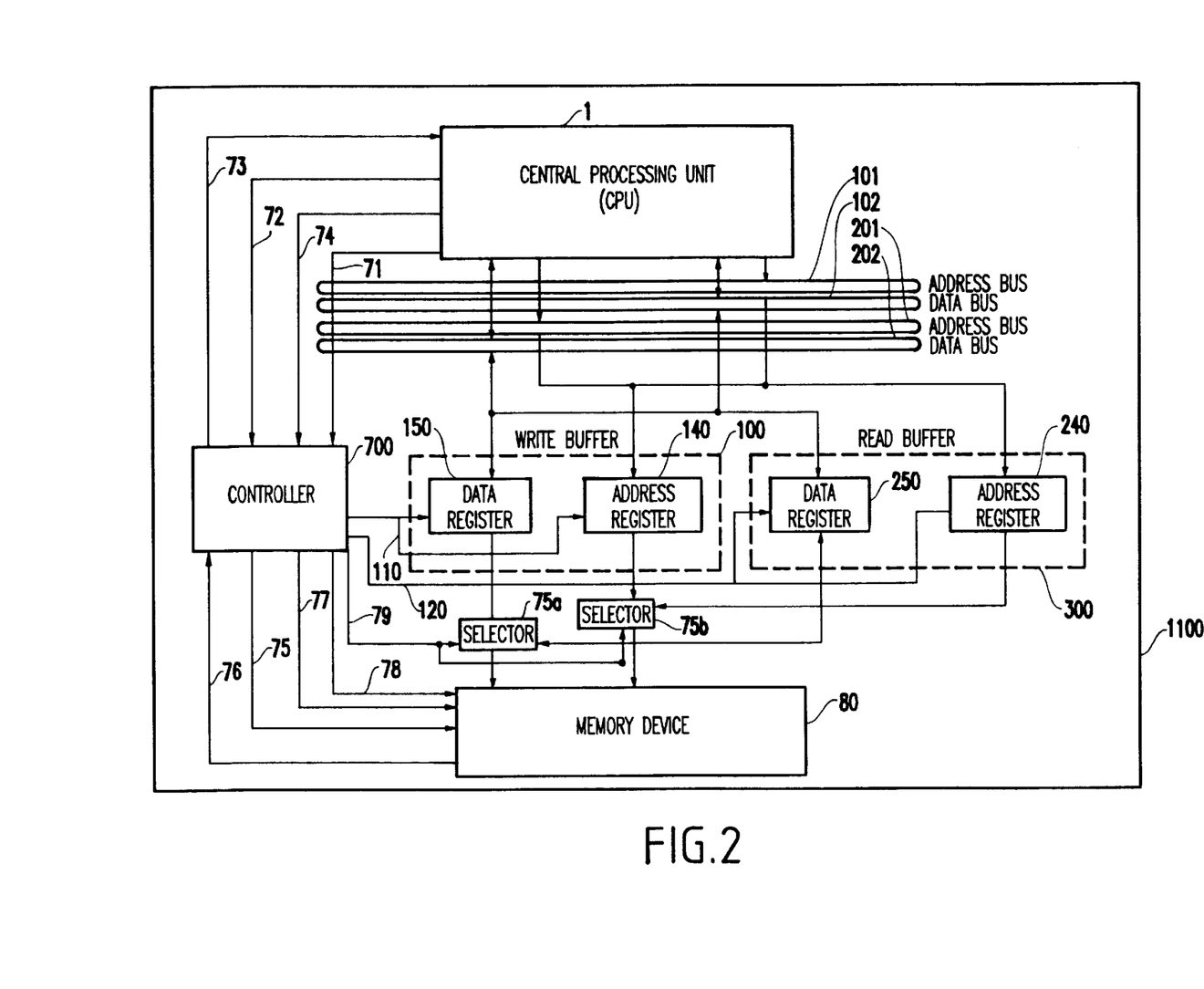
FIG. 2 is a diagram of a single-chip semiconductor memory system having a buffer according to a first embodiment of the present invention.

Referring now to the drawings, and more particularly to FIG. 2, a single-chip semiconductor memory system 1100 is explained according to a first embodiment of the present invention.

In the first embodiment, the memory system 1100 includes a central processing unit (CPU) 1 for executing instructions, a write buffer 100, a read buffer 300, a memory device 80 for storing data and instructions, a controller 700 for controlling the write buffer 100, the read buffer 300 and the memory device 80, an address bus 101, a data bus 102, an address bus 201, and a data bus 202.

The CPU 1 executes an instruction by using data from the memory device 80, outputs a write-request signal 72, a read-request signal 74 and an instruction-request signal 71, and receives an acknowledge signal 73. The CPU 1 changes the write-request signal 72 to an active level (e.g., "1") from an inactive level (e.g., "0"), when the CPU outputs data to the data bus 202. Simultaneously, the CPU 1 outputs an address to the address bus 201.

The CPU 1 changes the read-request signal 74 to an active level (e.g., "1") from an inactive level (e.g., "0") and changes (or keeps) the instruction-request signal 71 to an inactive level (e.g., "0"), when the CPU 1 outputs an address to the address bus 201. When the CPU outputs the address to the address bus 101, the CPU 1 changes the read-request signal 74 to an active level (e.g., "1") from an inactive level (e.g., "0") and changes the instruction-request signal 71 to an active level (e.g., "1") from an inactive level (e.g., "0").

The write buffer 100 includes a data register 150 and an address register 140. When a latching signal 110 is changed to an active level (e.g., "1") from an inactive level (e.g., "0"), the data register 150 and the address register 140 latch data on the data bus 202 and the address bus 201 (or-the data bus 102 and the address bus 101), respectively, and output the data.

The read buffer 300 includes a data register 250 and an address register 240. When a latching signal 120 is changed to an active level (e.g., "1") from an inactive level (e.g., "0"), the data register 250 and the address register 240 latch data on the data bus 202 and the address bus 201 (or the data bus 102 and the address bus 101), respectively, and output the data.

The controller 700 changes a write-request signal 75 and the latching signal 110 to an active level (e.g., "1") from an inactive level (e.g., "0"), when the write-request signal 72 is changed to an active level (e.g., "1"). At this time, the controller 700 changes a selector control signal 79 to an active level (e.g., "1") from an inactive level (e.g., "0") for connecting the write buffer 100 and the memory device 80 by using selectors 75a and 75b.

Moreover, the controller 700 changes a read-request signal 77 and the latching signal 120 to an active level (e.g., "1") from an inactive level (e.g., "0"), when the 5 read-request signal 74 is changed to an active level (e.g., "1"). At this time, the controller 700 changes a selector control signal 79 from an active level (e.g., "1") to an inactive level (e.g., "0") for connecting the read buffer 300 and the memory device 80 by using selectors 75a and 75b.

Further, the controller 700 changes an interrupt signal 78 and the latching signal 120 to an active level (e.g., "1") from an inactive level (e.g., "0"), when the instruction-request signal 71 is changed to an active level (e.g., "1"), even if the write-request signal 75 has an active level (e.g., "1"). At this time, the controller 700 changes a selector control signal 79 from-an active level (e.g., "1") to an inactive level (e.g., "0") for connecting the read buffer 300 and the memory device 80 by using selectors 75a and 75b.

If the write-request signal 75 has an active level (e.g., "1") when the controller 700 changes an interrupt signal 78 to an active level (e.g., "1"), first, the controller 700 changes the write-request signal 75 to an inactive level (e.g., "0") for canceling the present operation operated by the memory device 80. Then, the controller 700 changes the write-request signal 75 to an active level (e.g., "1") after an acknowledge signal 76 is changed to an active level (e.g., "1") from an inactive level (e.g., "0").

The controller 700 changes the selector control signal 79 from an inactive level (e.g., "0") to an active level (e.g., "1") for connecting the write buffer 100 and the memory device 80 by using selectors 75a and 75b, after an acknowledge signal 76 is changed to an active level (e.g., "1") from an inactive level (e.g., "0").

The memory device 80 writes the data outputted by the write buffer 100 to a memory cell array in the memory device 80, by using the address outputted by the write buffer 100, when the write-request signal 75 has an active level (e.g., "1") (e.g., indicating a writing operation). After finishing the writing operation, the memory device 80 changes an acknowledge signal 76 to an active level (e.g., "1") from an inactive level (e.g., "0"). At this time, the controller 700 receives the acknowledge signal 76, and changes an acknowledge signal 73 to an active level (e.g., "1") from an inactive level (e.g., "0"), to inform the CPU 1 that the writing operation has finished.

The memory device 80 reads data (e.g., not an instruction) from the memory cell array by using the address outputted by the read buffer 300, and outputs the data to the read buffer 300, when the read-request signal 77 has an active level (e.g., "1") (e.g., reading operation for data). After finishing the reading operation, the memory device 80 changes an acknowledge signal 76 to an active level (e.g., "1") from an inactive level (e.g., "0").

When the controller 700 receives the acknowledge signal 76 of an active level, the controller 700 changes an acknowledge signal 73 and the latching signal 120 to an active level (e.g., "1") from an inactive level (e.g., "0"), to inform the CPU 1 that the reading operation has finished and to make the data register 250 in the read buffer 300 latch the data, respectively. Then, the CPU 1 receives the data outputted by the data register 250 from the data bus 202, and executes some instruction(s) by using the data.

When the interrupt signal 78 is changed to an active level (e.g., "1"), the memory device 80 cancels the present operation. Then, the memory device 80 executes a reading operation for receiving an instruction by using an address outputted by the read buffer 300, and outputs the instruction to the read buffer 300 (e.g., a reading operation for an instruction). After finishing the reading operation, the memory device 80 changes an acknowledge signal 76 to an active level (e.g., "1") from an inactive level (e.g., "0"). Then, the CPU 1 receives the instruction outputted by the data register 250 from the data bus 102, and executes the instruction.

Figure 3:
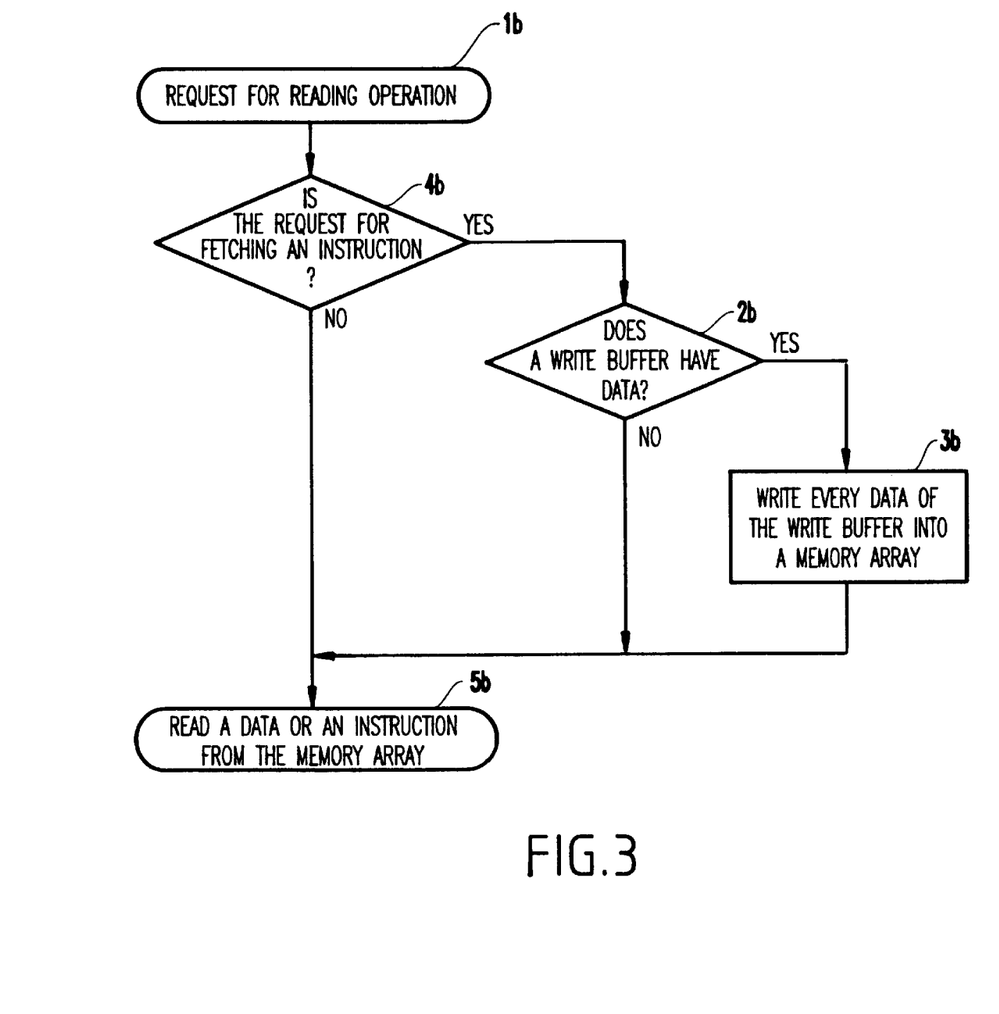
FIG. 3 is a flowchart showing a reading operation of the single-chip semiconductor memory system according to the first embodiment of the present invention.

FIG. 3 shows a flowchart for describing a reading operation of the memory system shown in FIG. 2.

First, in step 1b, the CPU requests a reading operation to the memory device for reading data (or instruction), when a present instruction indicates an operation for fetching data (or fetching an instruction).

In step 4b, it is determined whether the request is for fetching an instruction. When the request is for fetching an instruction (e.g., a "YES" in step 4b), the memory device 80 immediately starts to read an instruction from the memory cell array in the memory device 80 (step 5b).

When the request is for fetching data (e.g., a "NO" in step 4b), the process continues to step 2b where it is determined whether the write buffer has data. When the buffer has data (e.g., a "YES" in step 2b), the process continues to step 3b and every data of the write buffer is written into the memory array. Then, the memory device starts a reading operation corresponding to the present instruction (step 5b) after finishing writing the buffer data (step 3b).

If, after step 4b, the write buffer has no data (e.g., a "NO" in step 2b), the memory device starts a reading operation corresponding to the present instruction immediately (5b).

Thus, with the first embodiment of the invention, a much faster and efficient operation results than that of the conventional system.

Figure 4:
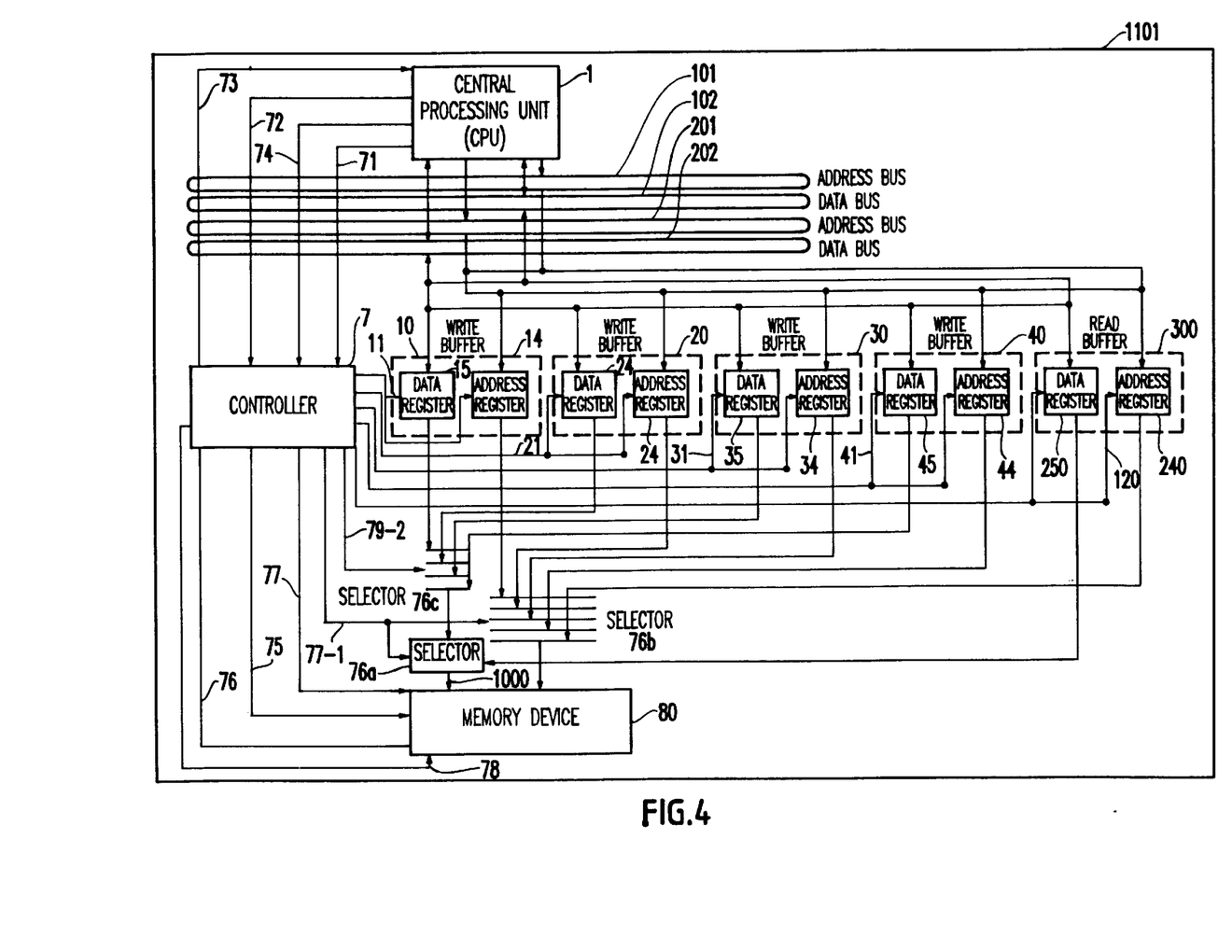
FIG. 4 is a diagram of a single-chip semiconductor memory system having a buffer according to a second embodiment of the present invention.

Referring now to the drawings, and more particularly to FIG. 4, a single-chip semiconductor memory system 1101 is explained according to a second embodiment of the present invention.

The same parts in FIG. 4 as those in FIG. 2 are numbered with the same reference numerals in FIG. 2, and for brevity, explanations of these parts are omitted from the following description.

The memory system 1101 includes a plurality of write buffers 10, 20, 30, and 40, and the write buffers 10–40 have priorities from, for example, the write buffer 10 to the write buffer 40.

The write buffer 10 includes a data register 15 and an address register 14, the write buffer 20 includes a data register 25 and an address register 24, the write buffer 30 includes a data register 35 and an address register 34, and the write buffer 40 includes a data register 45 and an address register 44. Therefore, for connecting an appropriate buffer to the memory device 80, the memory system 1101 includes selectors 76a, 76b and 76c, and a controller 7.

Therefore, when requests for a writing operation occur sequentially, the write buffer 10 can store data and an address first, and secondly, the write buffer 20 can store a next data and a next address. Further, thirdly, the write buffer 30 can store a next data and a next address, and finally, the write buffer 40 can store next data and a next address.

The controller 7 controls signals 73, 75, 77 and 78 in the same manner as the controller 700 shown in FIG. 2.

The controller 7 activates latching signals 11, 21, 31 and 41 in order according to a priority scheme for latching data in one of the write buffers, and controls selector control signals 79-1 and 79-2 for connecting one of the write buffers and the memory device 80 by using selectors 76a, 76b and 76c, according to the priority scheme, when several writing operations are requested by the CPU 1.

In this case, every time the acknowledge signal 76 is changed to an active level (e.g., "1") from an inactive level (e.g., "0"), the controller 7 changes a write buffer connected to the memory device 80 to another write buffer having a lower priority, thereby connecting the write buffer having the lower priority to the memory device 80, by using the selector control signals 79-1 and 79-2 (e.g., wherein these signals have a plurality of bits).

Moreover, the controller 7 controls the selector control signal 79-1 for connecting the read buffer 300 and the memory device 80 by using selectors 76a and 76b, when a reading operation is required by the CPU 1.

Further, when the reading operation for receiving an instruction is required by the CPU 1, the controller 7 controls the selector control signal 79-1 for connecting the read buffer 300 and the memory device 80 by using selectors 76a and 76b, even if the write-request signal 75 has an active level (e.g., "1").

If the write-request signal 75 has an active level (e.g., "1") when the controller 7 changes an interrupt signal 78 to an active level (e.g., "1"), at first, the controller 7 changes the write-request signal 75 to an inactive level (e.g., "0"). Then, the controller 7 changes the write-request signal 75 to an active level (e.g., "1") again. The controller 7 controls the selector control signals 79-1 and 79-2 for connecting a write buffer, which was connected to the memory device 80 before the reading operation for obtaining an instruction was requested, and the memory device 80 by using selectors 76a, 76b and 76c, after an acknowledge signal 76 is changed to an active level (e.g., "1") from an inactive level (e.g., "0").

Figure 5:
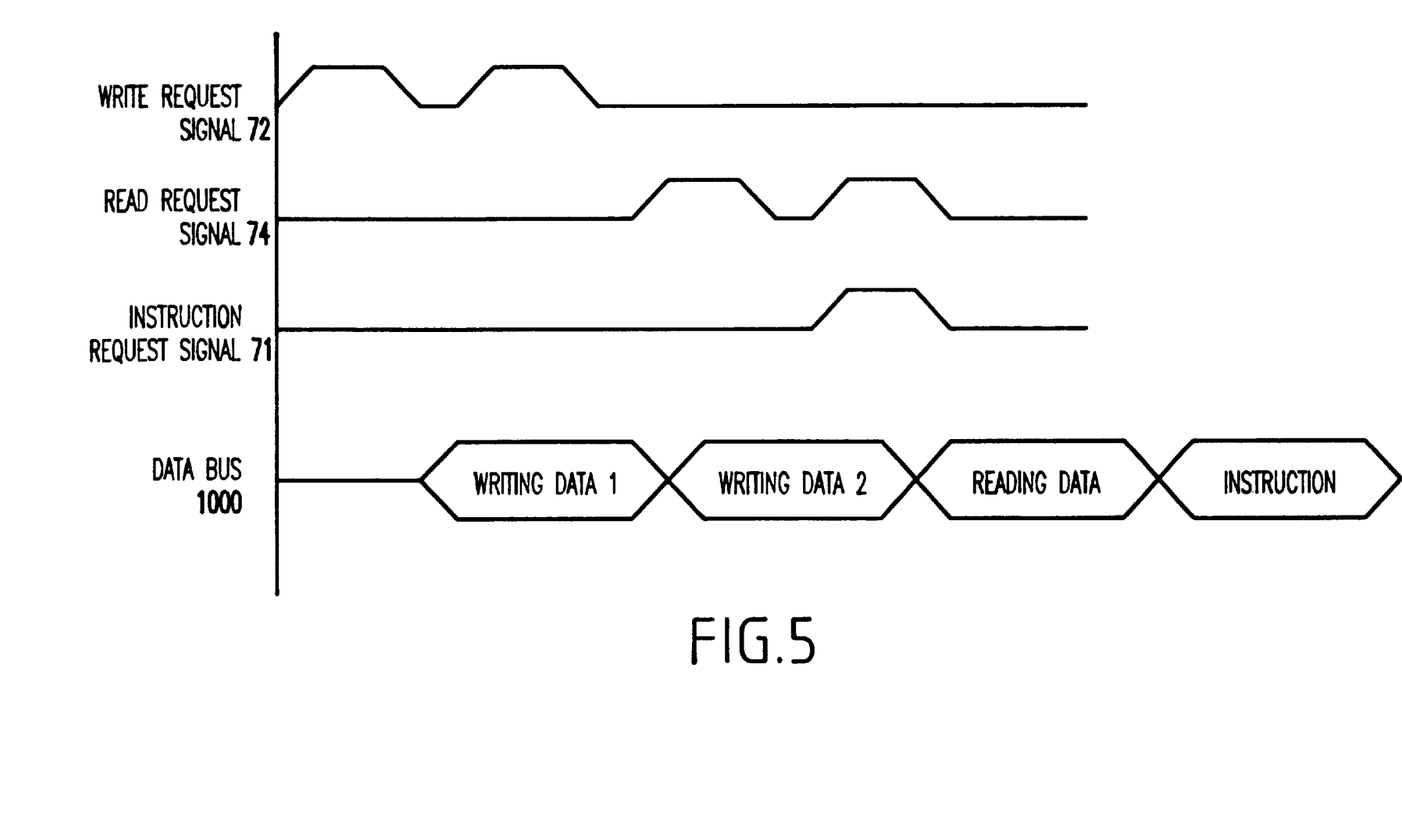
FIG. 5 is a timing chart for showing an operation of the single-chip semiconductor memory system according to the second embodiment of the present invention.

FIG. 5 shows a timing chart for describing a reading operation of the memory system shown in FIG. 4.

As shown in FIG. 5, the CPU 1 activates the write-request signal twice continuously. However, the CPU 1 in the second embodiment need not wait for executing an instruction until the memory device 80 finishes a corresponding writing operation, because there are a plurality (e.g., four in the exemplary construction of FIG. 4) of write buffers for storing data and an address for the writing operations.

Further, although the CPU 1 in the first embodiment must wait for executing an instruction when the writing operations are required three times continuously, the CPU 1 in the second embodiment need not wait for executing an instruction even if the writing operations are required three times continuously, because of a plurality of write buffers (e.g., four).

However, when a reading operation for an instruction is required after a reading operation for data (e.g., not an instruction) is required, as shown in FIG. 5, the CPU 1 must wait to obtain an instruction until the reading operation for data is finished, because the read buffer 300 in the second embodiment receives an address for a data or an address for an instruction.

The third embodiment of the present invention solves the above-mentioned problem, as explained below.

Figure 6:
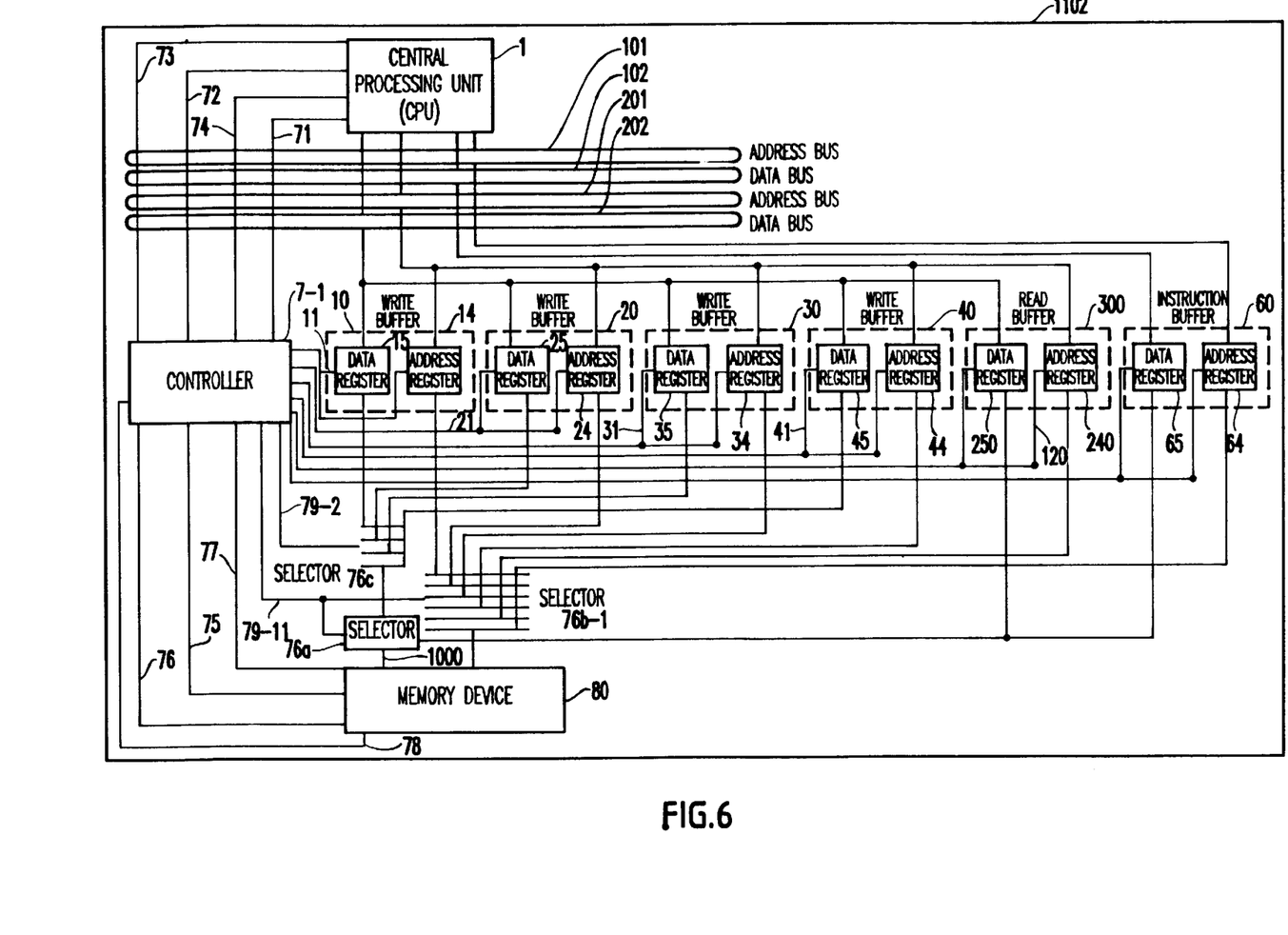
FIG. 6 is a diagram of a single-chip semiconductor memory system having a buffer according to a third embodiment of the present invention.

Referring now to the drawings, and more particularly to FIG. 6, a single-chip semiconductor memory system 1102 is explained according to the third embodiment of the present invention.

The same parts in FIG. 6 as those in FIG. 4 are numbered with the same reference numerals in FIG. 6, and for brevity, explanations of these parts are omitted from the following description.

The memory system 1102 includes an instruction buffer 60 having a data register 65 and an address register 64. The instruction buffer 60 includes, for example, a special buffer for receiving an address for an instruction, and for outputting an instruction to the CPU 1. Therefore, the data register 65 in the instruction buffer 60 is connected to the data bus 102, and the address register 64 in the instruction buffer 60 is connected to the address bus 101. The other buffers 10, 20, 30, 40 and 300 are connected to buses 201 and 202, but not buses 101 and 102, as in the third embodiment of FIG. 4.

For connecting the instruction buffer 60 and the memory device 80, the memory system 1102 includes a selector 76b-1 instead of the selector 76b shown in FIG. 4. Further, for controlling the selector 76b-1, the controller 7-1 controls a selector control signal 79-11 instead of the selector control signal 79-1 shown in FIG. 4.

The controller 7-1 controls signals, except for a latching signal 63 and the selector control signal 79-11, in the same manner as the controller 7 shown in FIG. 4. Regarding the latching signal 120, the controller 7-1 controls the signal 120 for operating the read buffer 300 for a reading operation for data, but not for a reading operation for an instruction.

When the reading operation for data (e.g., not an instruction) is required by the CPU 1, the controller 7-1 controls the selector control signal 79-11 for connecting the read buffer 300 and the memory device 80 by using selectors 76a and 76b-1. Then, when the memory device 80 changes the acknowledge signal 76 after finishing the reading operation for data, the controller 7-1 changes the latching signal 120 for latching data outputted by the memory device 80 to data register 250 in the read buffer 300.

When the reading operation for an instruction is required by the CPU 1, the controller 7-1 controls the selector control signal 79-11 for connecting the instruction buffer 60 and the memory device 80 by using selectors 76a and 76b-1, even if the writing operation or the reading operation for data are executed by the memory device 80.

If the writing operation or the reading operation for data are executed when the controller 7-1 changes an interrupt signal 78 to an active level (e.g., "1"), first, the controller 7-1 changes the write-request signal 75 or the read-request signal 77 to an inactive level for canceling the operation. Then, the controller 7-1 controls the selector control signals 79-11 and 79-2 for connecting a write buffer or a read buffer, which was connected to the memory device 80 before the reading operation for an instruction was requested, and the memory device 80 by using selectors 76a, 76b-1 and 76c, after an acknowledge signal 76 is changed to an active level (e.g., "1") from an inactive level (e.g., "0").

Figure 7:
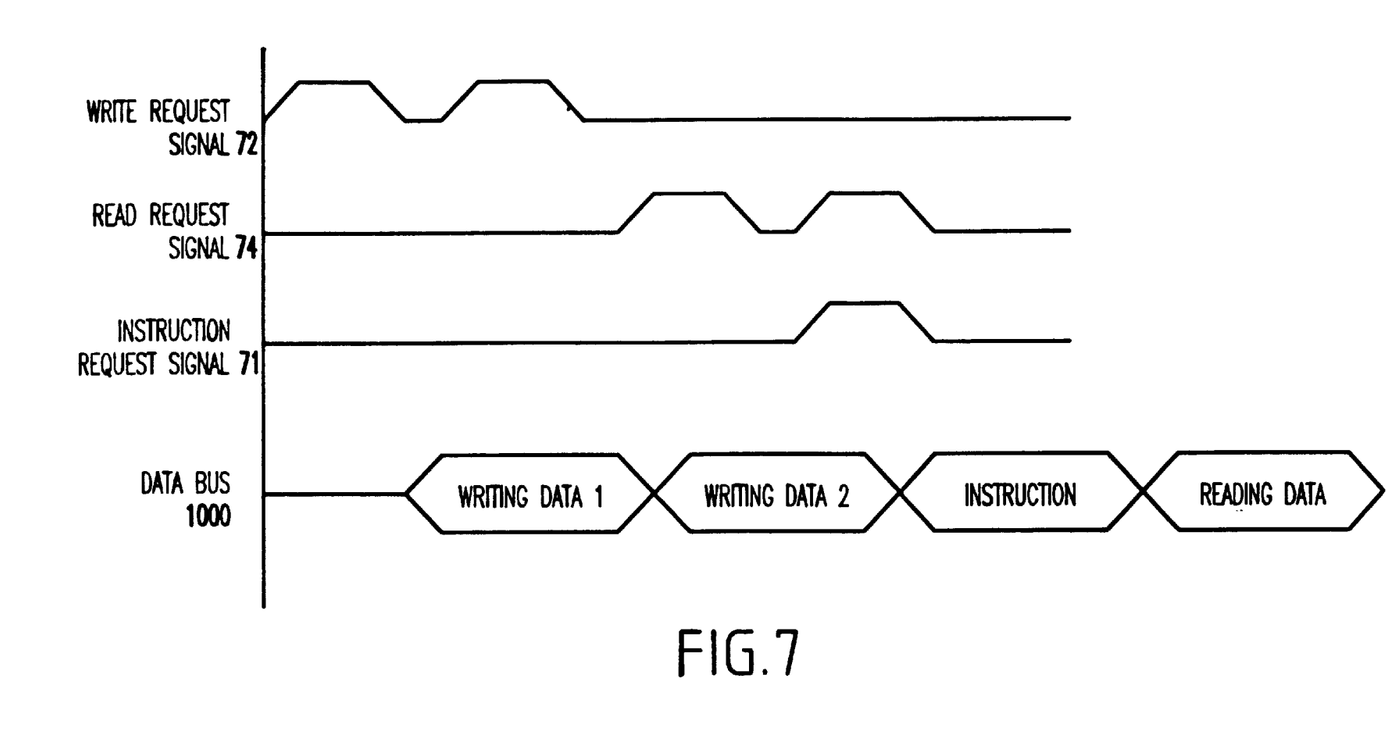
FIG. 7 is a timing chart for showing an operation of the single-chip semiconductor memory system according to the third embodiment of the present invention.

FIG. 7 shows a timing chart for describing a reading operation of the memory system shown in FIG. 6.

As shown in FIG. 6, the memory system according to the third embodiment has the same advantages as the first and second embodiments. Further, although the CPU 1 in the second embodiment must wait for getting an instruction until the data reading operation is finished, the memory device 80 outputs an instruction even if an instruction reading operation is required after the data reading operation is required. Therefore, the memory system 1102 according to the third embodiment executes instructions much faster than the conventional memory systems.

In these embodiments, as known by one of ordinary skill in the art taking the present specification as a whole, the number of write buffers, read buffers and instruction buffers can be changed depending on the design of the memory system.

While the invention has been described in terms of several preferred embodiments, those skilled in the art will recognize that the invention can be practiced with modification within the spirit and scope of the appended claims.

What is claimed is:

1. A memory system, comprising:

a central processing unit (CPU) for executing a first instruction, and for outputting first, second and third signals;

a memory device for storing first data and said first instruction;

a first buffer for storing second data;

a second buffer for storing third data; and a controller for writing said second data and said third data in order into said memory device when said controller receives said first signal twice, and for reading said first data from said memory device after writing said second data and said third data into said memory device when said controller receives said second signal, said controller for canceling writing said second data or writing said third data when said controller receives said third signal during said writing said second data or writing said third data, reading said first instruction from said memory device, and then, starting said writing said second data or writing said third data again.

2. The memory system as recited in claim 1, wherein said first buffer latches said second data outputted by said CPU when said CPU outputs said first signal, and said second buffer latches said third data outputted by said CPU when said CPU again outputs said first signal.

3. The memory system as recited in claim 2, further comprising:

a third buffer for storing said first data outputted by said memory device, and for outputting said first data to said CPU, wherein said CPU executes said first instruction by using said first data.

4. The memory system as recited in claim 3, further comprising:

a first data bus connected to a first node of said CPU, said first buffer, said second buffer and said third buffer;

a second data bus connected to a second node of said CPU;

a fourth buffer connected to said second data bus, for storing said first instruction outputted by said memory device, and for outputting said first instruction to said second data bus, wherein said first buffer receives said second data through said first data bus, said second buffer receives said third data through said first data bus, said third buffer outputs said first data to said CPU through said first data bus, and said CPU receives said first instruction on said second data bus, and executes said first instruction.

5. The memory system as recited in claim 4, wherein said memory system is formed on a single semiconductor chip.

* * * * *